United States Patent [19]

van der Burg et al.

[11] 4,212,340
[45] Jul. 15, 1980

[54] RADIAL TIRE WITH BEAD REINFORCING ELEMENTS

[76] Inventors: Sjirk van der Burg, 27, Avenue du Bois, B-4920 Embourg, Belgium; Karl A. Grosch, Uelenbender Weg 22, D-1506 Roetgen (Rott), Fed. Rep. of Germany; Marcel J. Bertrand, 147 Rue de Garillarmont, B-4030 Grivegnée-Liège, Belgium

[21] Appl. No.: 858,911

[22] Filed: Dec. 5, 1977

Related U.S. Application Data

[62] Division of Ser. No. 620,971, Oct. 9, 1975, Pat. No. 4,074,743.

[30] Foreign Application Priority Data

Nov. 25, 1974 [DE]  Fed. Rep. of Germany ....... 2455709

[51] Int. Cl.² .............................................. B60C 9/00
[52] U.S. Cl. ................................. 152/355; 152/362 R
[58] Field of Search ............. 152/362 R, 362 CS, 354, 152/355

[56] References Cited

U.S. PATENT DOCUMENTS

| | | | |
|---|---|---|---|
| 3,253,636 | 5/1966 | Travers | 152/362 R X |
| 3,392,773 | 7/1968 | Warren et al. | 152/362 R X |
| 3,612,138 | 10/1971 | Ravenhall | 152/354 X |
| 3,736,973 | 6/1973 | Mezzanotte et al. | 152/362 R X |
| 3,841,377 | 10/1974 | Montagne | 152/362 CS |
| 3,921,693 | 11/1975 | Suzuki et al. | 152/362 R |
| 4,074,743 | 2/1978 | van der Burg et al. | 152/362 R X |

*Primary Examiner*—F. J. Bartuska
*Attorney, Agent, or Firm*—Philip Rodman

[57] ABSTRACT

A radial carcass pneumatic tire having a carcass ply turn-up portion includes a reinforcement ply folded around each bead ring. Each reinforcement ply overlaps and extends beyond the turn-up edge of the carcass play and includes for example a steel cord portion of thick cross-section abutting a textile cord portion of thinner cross section. The cords throughout the reinforcement ply are arranged obliquely with the cords of the radial carcass ply. In other respective embodiments a transition zone between the thick and thin portions of the reinforcement ply includes a cover strip, an overlapping portion and a filler strip. The bead reinforcement constructions reduce bead element edge separations and provide a desirable graduated stiffness from the bead to the beginning area of the sidewall permitting optimal transferring of torque and force.

12 Claims, 6 Drawing Figures

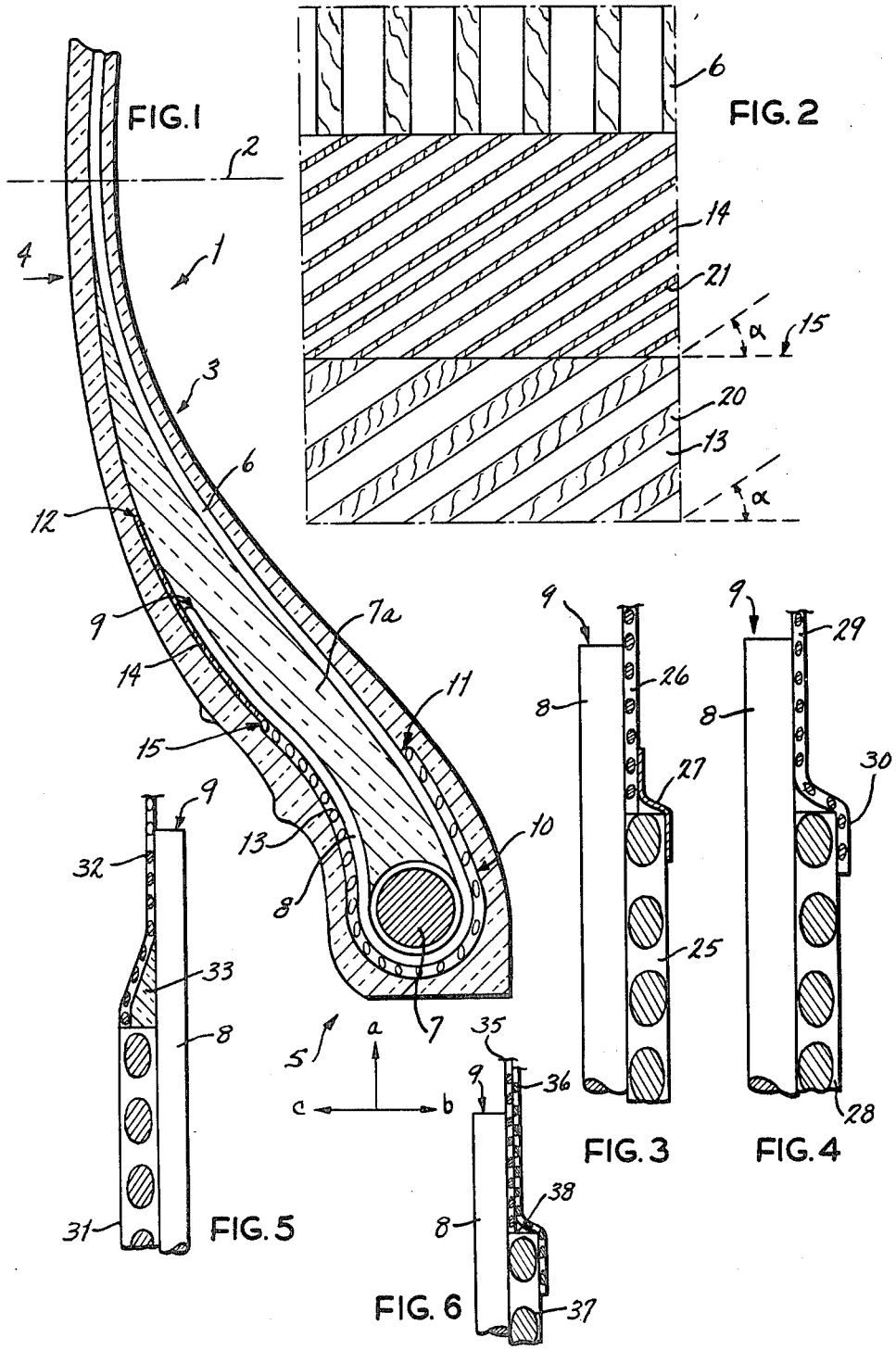

RADIAL TIRE WITH BEAD REINFORCING ELEMENTS

This is a division of application Ser. No. 620,971, filed Oct. 9, 1975 now U.S. Pat. No. 4,074,743.

This invention is directed to pneumatic tires for motor vehicles and more particularly to a bead area reinforcement construction for a radial carcass-type pneumatic tire.

It is well known that pneumatic tires comprising radial carcasses are generally quite flexible in the sidewall areas. Occasionally the sidewall flexions of a rotating radial tire as a consequence of the usual service loads will cause premature tire failure at the bead area before the tread life expectancy has been reached. Attempts to solve the problem of tire failure in this area have been made on previous occasions such as indicated in U.S. Pat. Nos. 2,958,360, 3,062,257, 3,118,482 and 3,253,639 which disclose reinforcing arrangements in the bead ring zone of a tire. Although the known reinforcing arrangements are intended to make the tire better able to withstand sidewall flexion there is still a recognized need to improve tire tolerances in this area by minimizing the risk particularly in truck tires that the ends of a carcass ply or a reinforcement ply will contribute to premature impairment and/or wear of the tire zone adjoining the tire bead area during travel of the tires under high load.

Among the several objects of the present invention may be noted the provision of a pneumatic tire for motor vehicles having improved means for transmitting torque from the bead ring area through the radial carcass; and, a reinforcement ply for the tire bead area which effectively absorbs forces acting in circumferential and radial directions on the tire body to ensure that the ends of the carcass and reinforcement ply do not cause premature wear or impairment of the tire walls adjoining the bead ring zone. Other objects and features of the invention will be in part apparent and in part pointed out hereinafter.

The present invention, in solving the problem of tire failure at the bead area due to sidewall flexion, includes novel means for transmitting torque and circumferential forces between the bead rings and the remaining tire body. In accordance with one embodiment of the invention a one-ply radial carcass of relatively thick steel cord elements in parallel arrangement includes a turn-up portion around each bead ring. Each turn-up portion is overlapped by a bead reinforcement having parallel cord elements that are oblique to the cord elements of the carcass ply. The reinforcement is preferably formed of a single ply comprising in cross section a relatively thick strip portion terminating below the turn-up edge of the carcass ply, and a relatively thinner strip portion extending beyond the turn-up edge of the carcass ply. The thinner strip portion, which abuts the thick strip portion, forms a continuation of the thick strip portion and can be of lesser stiffness than the thick strip portion. The turn-up edge of the carcass ply is thus overlapped and covered by the thinner strip portion of the reinforcement ply. Therefore only a fractional area of the normally heavier cord elements of the thick reinforcing strip are bared at the junction with the thinner reinforcing strip since the remaining cross-sectional area of the thicker strip cord elements is covered by the thin reinforcing strip. Tire abrasion due to friction or rubbing of the thick strip cord element ends against the bead rubber is thereby greatly reduced. The flexibility of the thin reinforcement strip covering the radial carcass cord ends at the turn-up edge permits flexion in this area without causing damage or premature wear of the tire even under heavy load and at high speed.

In another embodiment of our invention the junction of the thick and thin reinforcement ply portions is covered with a thin rubber strip to shield the bead rubber from the bared cord elements of the thick reinforcing strip thereby reducing the risk of potential crack formation in the bead area due to projecting cord element ends. In still another embodiment of our invention a filler strip tapered in cross section is positioned at the end of the thicker reinforcing strip to cover the bared cord elements not covered by the thinner reinforcing strip. In a further embodiment the thin section of the reinforcement ply overlaps the end of the thick section and thereby covers it along a predetermined length. In still a further embodiment of the invention double thin strips of material are arranged to join the end of the thick reinforcing strip. One of the strips of material is provided with cord elements having the identical pitch as the thick reinforcing strip whereas the other thin strip of reinforcing material has cord elements which are at a different inclination from that of the first reinforcing strip.

The invention accordingly comprises the constructions hereinafter described, the scope of the invention being indicated in the following claims.

In the accompanying drawing in which various possible embodiments of the invention are illustrated, FIG. 1 is a sectional view of the bead area of a tire incorporating one embodiment of the present invention;

FIG. 2 is a top plan view of the cord arrangement in the radial carcass ply in relation to the cord arrangements of the thick and thin strips of the reinforcement ply; and, FIGS. 3 to 6 illustrate other embodiments of the reinforcement ply and the carcass ply turn-up.

Referring now to the drawing for a detailed description of the present invention a fragmentary portion of a pneumatic tire is generally indicated by reference number 1 in FIG. 1. The arrow designated a in FIG. 1 identifies the outer radial direction, the arrow designated b identifies the axial direction toward the inside 3 of the tire, and the arrow designated c identifies the axial direction toward the outside 4 of the tire. A dotted line designated 2 represents the level at which the tire 1 has its maximum axial width.

The tire 1, which is suitable for use on trucks, includes a radially inner left hand bead portion generally indicated by reference number 5, and a one ply carcass 6 having radially oriented cord elements 6a arranged parallel to one another. The cord elements 6a, which can be formed of relatively thick strands of high strength steel, run substantially in the plane of the drawing and parallel thereto. A turn-up portion 8 of the carcass ply 6 is formed by folding the cord elements 6a around a bead ring 7 from the inside portion 3 of the tire 1 to the outside portion 4. An apex strip insert 7a extends from the bead ring 7 up into the sidewall area of the tire toward the level 2 of maximum axial tire width. The carcass ply turn-up portion 8 terminates radially outside the bead area 5 at an edge 9 outside the insert 7a.

A reinforcement ply 10 comprising a thick main strip 13 and a thinner terminal strip 14 is wrapped about the radial carcass ply 6 at the bead ring 7 and is also wrapped about the carcass ply turn-up portion 8. The reinforcement ply 10, has a first terminal edge 11 at the inside 3 of the tire 1 and a second terminal edge 12 at the outside 4 of the tire 1 extending radially beyond the turn-up edge 9 of the carcass ply turn-up 8. The reinforcement ply 10 thus shields the outer portion 4 of the tire 1 from the cord elements 6a at the turn-up edge 9 thereby preventing premature wear and/or damage to the tire at this location.

The main strip 13 of the reinforcement 10 includes relatively thick, high-strength, steel cord elements 20 (FIG. 2) which are comparable to the cord elements 6a of the radial carcass ply 6. The cord elements 20, if extended to the terminal edge 12 of the reinforcement 10, could cause premature wear or damage at this location. Consequently the terminal strip 14 of the reinforcement 10 is of a reduced thickness and strength in comparison to the main strip 13, with thinner cord elements 21 than the cord elements 20 of the main strip 13. A transition between the main strip 13 and the terminal strip 14 can proceed gradually such as by having the main strip 13 and the terminal strip 14 formed as a one-piece structure. Preferably however the transition is in the form of a step 15 with the two separate sections 13 and 14 abutting one another.

The reinforcement ply 10 serves the purpose of transferring torque absorbed from the rim (not shown) via the bead ring area into the tire body, a function that is also but not entirely satisfactorily performed by the radial cord elements 6a of the radial carcass ply 6. The desired transfer of forces to the tire body by the reinforcing ply 10 is attributable in part to the relatively thick, high-strength, steel cord elements 20 (FIG. 2) in the main strip 13 which are arranged at a bias with respect to the radially running cord elements 6a of the radial carcass 6, namely at an angle alpha $\alpha$ (FIG. 2) with respect to the center line of the bead ring 7. The angle $\alpha$ can vary within a relatively wide range and still permit the reinforcement ply 10 to adequately transfer torque from the bead ring 7 into the tire and vice-versa. As a result of the pairing of the obliquely running cord elements 20, 21 of the reinforcement ply 10 and the radially oriented cord elements 6a of the carcass ply 6 the torque and the circumferential forces are effectively transmitted between the bead rings 7 and the remaining tire body.

Other embodiments of my invention, depicted in FIGS. 3–6, show the radial carcass ply turn-up portion 8 and the turn-up edge 9 overlapped by a reinforcement generally comprising a thick sectioned steel cord material such as used in a heavy-duty truck tire and a thinner sectioned textile cord material such as used in a passenger car tire.

In the embodiment of FIG. 3 a thick main section 25 of the reinforcement ply abuts against a thinner terminal section 26. A thin cover strip 27 covers the transition step between the sections 25 and 26 shielding the thick steel cord elements of thick section 25 from exposure against an adjoining wall portion of the tire (not shown) thereby preventing premature damage and/or wear at this location to the tire under load.

In the embodiment of FIG. 4 a thick main section 28 of the reinforcement ply is overlapped at 30 by a thinner terminal section 29 to likewise shield the heavy steel cord elements of the thick section 28 from an adjoining wall portion (not shown) of the tire.

In the embodiment of FIG. 5 the thickness gradation at the transition zone of the reinforcement ply is arranged adjacent the turn-up 8 of the carcass 6 and filled in by a filler strip 33. Accordingly a thick main section 31 of the reinforcement ply abuts against a thinner terminal section 32, with the wedge shaped filler 33 being provided at the transition point to completely cover the thick steel cord elements of the main section 31.

In the embodiment of FIG. 6 the terminal section of the reinforcement ply comprises two adjacent relatively thin strips of material 35 and 36. One of the thin strips 35 which is positioned adjacent the radial carcass ply turn-up 8 abuts against a thicker main section 37 of the reinforcement ply whereas the other thin strip 36 overlaps the thick section 37 at the transition step 38. The cord elements of the strip 35 have the identical pitch as the cord elements of the main section 37 whereas the cord elements of the strip 36 are at a different inclination from that of the strip 35. If desired the thin strip 36 can be arranged to abut against the thick main section 37 and a thinner cover strip, similar to strip 27 of FIG. 3 or a filler strip similar to the wedge shaped filler 33 of FIG. 5 can be used to cover any exposed steel cord elements of the main section 37.

According to a variant of the invention an additional biased position between the cord elements of the carcass ply turn-up 6 and the cord elements of the reinforcement 10 can be accomplished by employing cord elements in the carcass ply turn-up 6 that deviate up to a range of approximately 10° from the radial direction.

As will be apparent to those skilled in the art the terminal edge 12 of the reinforcement ply does not constitute a hazard point for premature wear and/or damage of a tire even under high speed and load. It will also be apparent that the transition zone of the reinforcement between the main and terminal sections is, in all embodiments, effectively shielded or covered so as to prevent premature wear and/or damage of the tire by the thick steel or other type of heavy cord elements in the main section of the reinforcement ply. In addition the ends of the thick steel cord elements 6a at the radial carcass turn-up edge 9, being covered by the thin terminal strip 14, are also effectively shielded from the tire wall and thus do not cause premature wear and/or damage to the tire in the area of the turn-up edge 9. Moreover in accordance with the disclosed constructions transfer of the torque between the bead ring area and the tire body is assured.

Some advantages of the present invention evident from the foregoing description include a bead reinforcement construction that reduces bead element edge separations by virtue of a thick main section that provides a desirable graduated stiffness from the bead to the beginning area of the sidewall permitting optimal transferring of torque and force between the two areas, and a thin terminal section having an edge portion that does not cause premature wear and/or damage to the tire.

In view of the above it will be seen that the several objects of the invention are achieved and other advantageous results obtained.

As various changes could be made in the above constructions without departing from the scope of the invention it is intended that all matter contained in the above description or shown in the accompanying drawing shall be interpreted as illustrative and not in a limiting sense.

What is claimed is:

1. In a motor vehicle pneumatic tire having an inner wall portion and an outer wall portion with a bead ring disposed therebetween and a radial carcass having parallel cord elements and a turnup portion folded about the bead ring from the inner wall portion toward the outer wall portion for termination in a turnup edge, a bead reinforcement folded about the bead ring and the carcass ply turnup portion from the inner wall portion to the outer wall portion and having a first terminal edge at the inner wall portion and a second terminal edge at the outer wall portion extending beyond the turnup edge of the carcass ply turnup portion, said bead reinforcement further including a main ply portion of predetermined thickness having a first cord material, said main ply portion extending from the first terminal edge to a transition zone at said outside wall portion between the bead ring and the turnup edge of said carcass ply with cord ends of said first cord material being at said transition zone, and a terminal ply portion of lesser thickness than said main ply portion and having a second cord material of lesser stiffness than said first cord material, said terminal ply portion extending from said transition zone, wherein said main ply portion and said terminal ply portion are in contact with one another, to said second terminal edge, at least a section of said terminal ply portion and said main ply portion being substantially coplanar along the radial carcass at said transition zone and the main ply portion and the terminal ply portion have cord elements of the same pitch inclined in the same direction running at a bias to the cord elements of the radial carcass ply.

2. The tire construction of claim 1 wherein the main portion and the terminal portion of said bead reinforcement abut against one another at said transition zone.

3. The tire construction of claim 2 wherein a filler portion is disposed at the transition zone to provide a substantially continuous transition between the main and terminal portions of the bead reinforcement along the radial carcass at the transition zone.

4. The tire construction of claim 1 wherein the main portion of the reinforcement ply comprises heavy duty cord material with metallic cords and the terminal portion of the reinforcement ply comprises a lighter duty cord material with textile cords.

5. The tire construction of claim 1 wherein the transition zone comprises a step between the main portion and the terminal portion of said bead reinforcement.

6. The tire construction of claim 5 further including a cover strip for covering the step at said transition zone between the main portion and the terminal portion of said bead reinforcement.

7. The tire construction of claim 5 wherein the step is defined at the outer wall portion and a cover strip is disposed at the transition zone along the outer wall portion to cover said step.

8. The tire construction of claim 1 wherein the transition zone between said main and terminal portions comprises a section of continuously varying thickness.

9. The tire construction of claim 1 wherein the radial carcass ply and the reinforcement include metallic cord elements of different pitch arranged such that the cord pitch in the carcass ply turn-up portion deviates up to 10° from the radial ply cord elements and is arranged opposite the pitch of the cord elements of the reinforcement ply.

10. The tire construction of claim 1 wherein the terminal portion of said reinforcement comprises double strips of cord material, the cord elements of each said strip being arranged at different pitches and wherein the cord elements of one of said strips are of the same pitch as the main ply portion.

11. The tire construction of claim 7 wherein the cover strip comprises a ply of cord material having cord elements that are arranged at a different pitch from that of the terminal ply portion.

12. The tire construction of claim 1 wherein the terminal ply portion of the reinforcement overlaps the main ply portion at the transition zone to form an overlap portion wherein the cord elements of the main ply portion and the terminal ply portion are superposed at the same pitch and inclination.

* * * * *